June 26, 1962     E. J. SVENSON     3,040,886
MASTER BRAKE CYLINDER Filed May 15, 1958     8 Sheets-Sheet 1

INVENTOR.
Ernest J. Svenson
By Olson & Trexler
Atty.

June 26, 1962 E. J. SVENSON 3,040,886
MASTER BRAKE CYLINDER
Filed May 15, 1958 8 Sheets-Sheet 3

Fig. 7.

Reject Stations.
5 #7 #9 #11

Fig. 8.
Porosity Test.
Station #6

Fig. 9.
Test Stop Lamp Switch
Station #8.

INVENTOR.
Ernest J. Svenson
BY
Olson & Trexler
attys.

United States Patent Office 3,040,886
Patented June 26, 1962

3,040,886
MASTER BRAKE CYLINDER
Ernest J. Svenson, Rockford, Ill., assignor to Odin Corporation, Rockford, Ill., a corporation of Illinois
Filed May 15, 1958, Ser. No. 735,409
23 Claims. (Cl. 209—72)

This invention relates to improvements in assembling methods and apparatus and, more particularly, to improvements in methods of and apparatus for automatically assembling the constituent elements of a master brake cylinder of the type now in use on motor vehicles, such as passenger automobiles, trucks, and the like.

For many years, applicant has been engaged in the development and commercialization of machine tools, hydraulic mechanisms and controls therefor. Much of this development and commercial activity has been closely identified with the automotive industry and has contributed materially to the speed and the accuracy of hydraulic equipment and internal combustion engine production and, in addition, has reduced maintenance problems to a marked degree. In keeping with this previous development and commercialization, applicant now proposes to provide improved methods and apparatus whereby units of a motor-driven vehicle, such as master brake cylinders, may be assembled automatically at a minimum cost, with the assurance that each unit will not only be properly assembled but also contemporaneously with such assembly, tested under conditions simulating those experienced in the field.

One object of the invention is to provide methods and apparatus employing hydraulic, electrical and mechanical structures to facilitate assembly and testing of master brake cylinders.

A further object of the present invention is to provide methods and apparatus whereby standard types of equipment, such as, for example, feeding hoppers, controls, conveyors, hydraulic actuators and the like, may be employed, thus reducing to a minimum, expense of maintenance and other costs which might otherwise be experienced in the development of special machinery.

A conventional master brake cylinder comprises a plurality of parts, such as the cylinder per se, a connector plug, pressure switch, cover, cover gasket, and cover securing screws. In addition to the automatic assembly of these parts, various tests must be made contemporaneously with the assembly operation, such as filling the master brake cylinder with fluid, pressure testing the cylinder, porosity tests, testing stop lamp switch operation, testing check valve and, finally, conditioning the assembled unit for shipment to the ultimate location at which it is to be assembled with an automobile. It is an object of the present invention to carry out the above steps of assembly and testing in rapid succession along a predetermined path of assembly with a minimum amount of manual effort and with the assurance that the parts will leave the assembly line properly assembled and ready for final assembly in an automobile.

The foregoing and other objects and advantages will be more apparent from the following detailed description considered in connection with the accompanying drawings wherein.

Referring, now, to the drawings more in detail, wherein like numerals have been employed to designate similar parts throughout the various views, attention is directed to the fact that, in the interest of simplicity of disclosure, applicant has refrained from detailed illustrations of standard equipment readily available on the market and well known to those skilled in this particular art. Also, with the view of more readily understanding the purpose and function of the method and apparatus contemplated by the present invention, it would be well, at the outset, to have a general understanding of the parts to be assembled and tested, namely, those parts which make up a standard type master brake cylinder unit. This master brake cylinder unit is shown somewhat in detail in the central sectional view, FIG. 14. This unit is designated, generally, by the numeral 32 and includes a master cylinder casting 34 presenting a cylinder chamber 36 in which a piston member 38 is mounted. The piston 38 is connected with a piston rod 40 and is provided with a sealing cup 42. A spring 44 is interposed between the sealing cup 42 and a valve device 46. This valve device is shown more in detail in the cross-sectional view of FIG. 15. A pressure-responsive switch device 48 is carried at one end of the cylinder casting and communicates with the cylinder chamber 36 through a passage 50 and the valve device 46. A threaded connector member 52 is mounted at the end of the cylinder casting immediately above the switch device 48. Immediately above the cylinder chamber 36 is a brake fluid reservoir 54. Communication between the reservoir or chamber 54 and the cylinder chamber 36 is through a passage 56. The unit 32 also includes a mounting flange 58 provided with bolt apertures 60. A resilient packing member 62 surrounds the piston 38 at the end thereof oppositely disposed from the cup 42 and cooperates with said cup in preventing leakage of brake fluid. An additional sealing member 64 engages the outer surface of the flange 58 and is coupled with an accordion type sealing member 66, which at its outer extremity engages within a peripheral groove of the piston rod 40. A cover member 68 is secured against an annular gasket 70 by a clamping screw or bolt 72.

From the foregoing, it should be understood that the elements of the brake cylinder unit to be assembled in accordance with the present invention are the pressure switch member 48, the connector member 52, the cover 68, gasket 70, and clamping bolt or screw 72. In addition to the assembly operations, various tests of the assembled unit are made in rapid succession, and if upon being tested, the unit does not meet the required standards, it is rejected from the assembly and test line. The aforementioned assembly and testing operations will be more clearly understood as the description progresses.

Figures 14, 15:
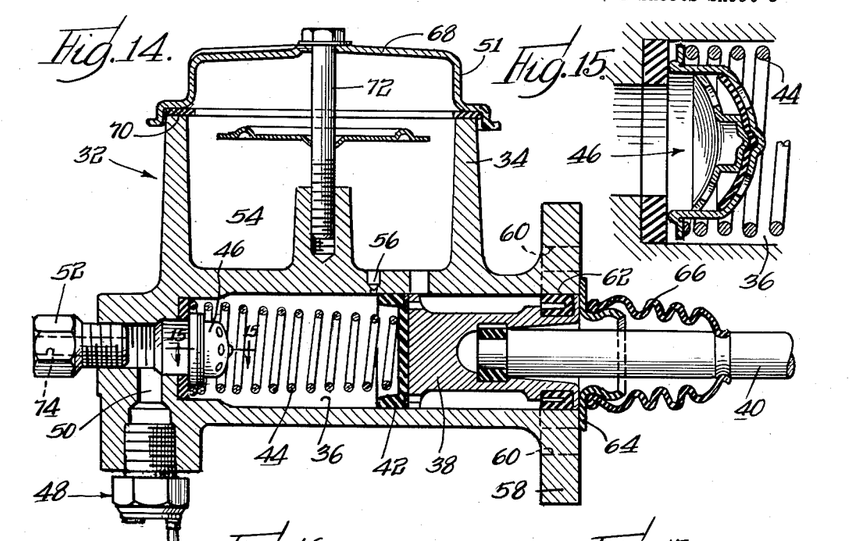
FIG. 14 is a vertical sectional view illustrating the essential parts of a master brake cylinder.
FIG. 15 is an enlarged vertical sectional view of the diaphragm valve mechanism, said view taken substantially along the line 15—15 of FIG. 14.

It will be apparent from the foregoing that if the compression chamber 36 is filled with brake fluid and the piston rod 40 is shifted to the left, FIG. 14, against the action of the coil spring 44, brake fluid will be directed through an aperture 74 in the connector 52 into conduits (not shown) connected with brake cylinders. As the piston cup 42 advances, the restricted orifice 56 is closed, thus enabling the development of fluid pressure within the compression chamber 36. It is important that this pressure is sufficient to actuate the valve device 46 and also the fluid responsive switch 48. This switch serves the purpose of closing the electric circuit connected with a conventional stop lamp (not shown). Failure to develop sufficient fluid pressure may result from several causes, such as an inadequate supply of brake fluid within the master cylinder, leakage of fluid past sealing rings and leakage due to the porosity of the master cylinder casting. Hence, it is extremely important that when a completely assembled master cylinder unit is delivered to the point of application to the car or truck that it be in perfect working condition. The present invention contemplates improved, practical methods and apparatus whereby the proper and expeditious assembly of the constituent parts of a master brake cylinder unit, as well as the testing of the unit under normal conditions of operation may be accomplished.

Figure 1:
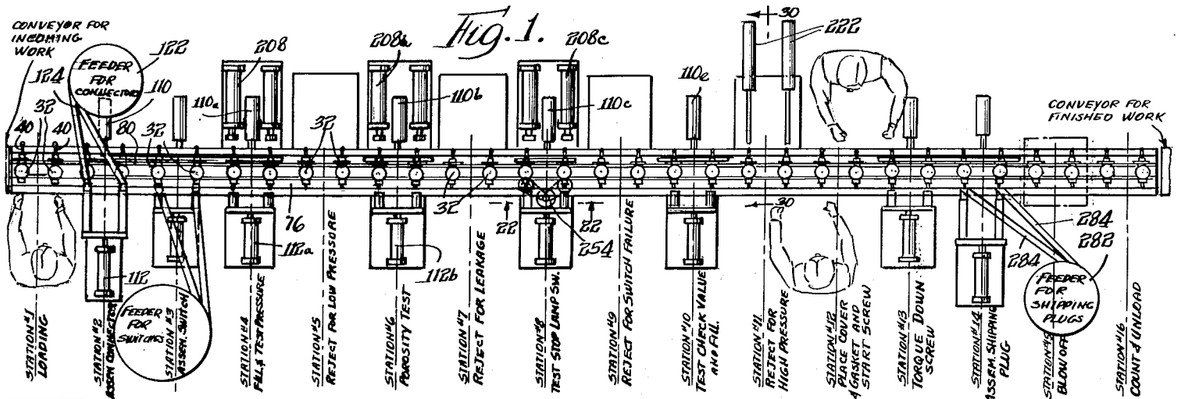
FIG. 1 is a semi-diagrammatic plan view of an assembly line showing the various stations of assembly and testing contemplated by the present invention.
Figure 2:
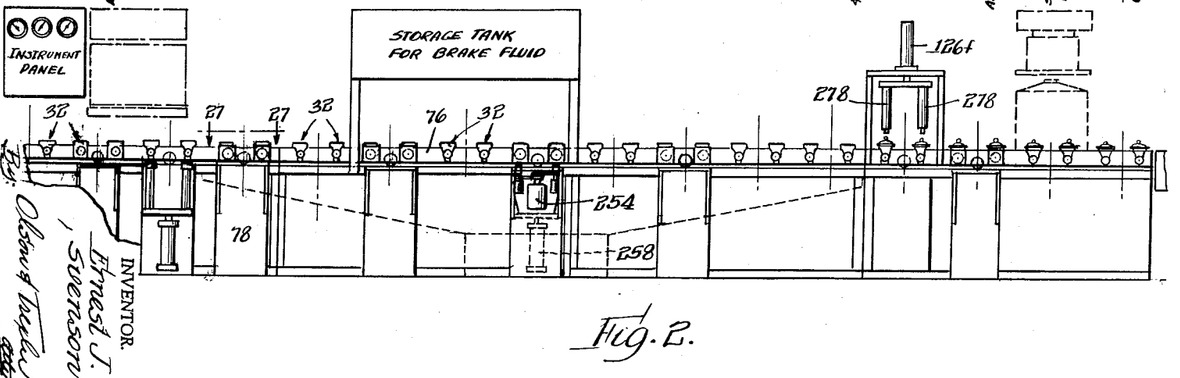
FIG. 2 is a front elevational view of the device as illustrated in FIG. 1.
Figures 27, 28, 29, 30:
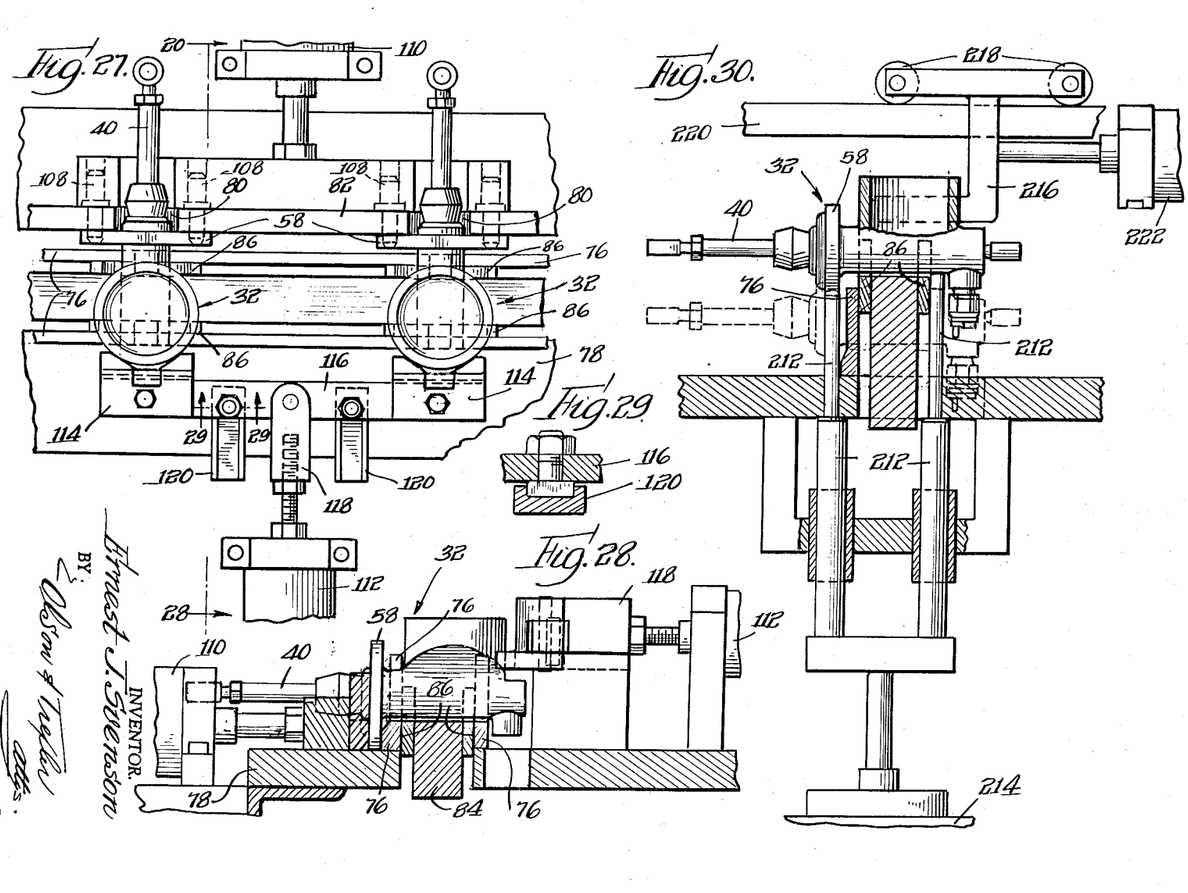
FIG. 27 is an enlarged fragmentary plan view taken substantially along the line 27—27 of FIG. 2.
FIG. 28 is a transverse sectional view taken along the line 28—28 of FIG. 27.
FIG. 29 is an enlarged detailed sectional view taken along the line 29—29 of FIG. 27.
FIG. 30 is an enlarged transverse sectional view of the reject mechanism taken substantially along the line 30—30 of FIG. 1.

Referring to FIGS. 1 and 2, wherein plan and elevational views, respectively, of the assembly and testing line are disclosed, it will be seen that a pair of the above described master brake cylinder members or castings is positioned in the assembly line at the place designated as Station #1. At this station an operator positions two master cylinder units 32 within complementary recesses in a pair of spaced longitudinally extending bars 76. These bars are supported in a fixed position upon a suitable base 78. At the time the units 32 are initially positioned in the recesses of the bars 76, said units do not have associated therewith the connector 52, the stop lamp switch 48, the cover 68, gasket 70 and the clamping screw or bolt 72. Also, at this stage of the process there is no brake fluid in the reservoir 54 or the compression chamber 36. As viewed in FIG. 1 at Station #1, the two units 32 when in proper position have their uncovered reservoirs facing upwardly in position to receive fluid, and the piston rods 40 extend rearwardly through recesses 80, FIG. 27, provided in a flange abutment or positioning plate 82. The flange 58 of each unit 32 is positioned in engagement with the longitudinal plate 82, FIGS. 20, 21, 27, and 28. It should also be understood that the units 32 may be brought into the vicinity of Station #1 by a suitable conveyor, said conveyor being indicated fragmentarily at the left extremity of FIG. 1.

Figures 3, 4, 5, 6:
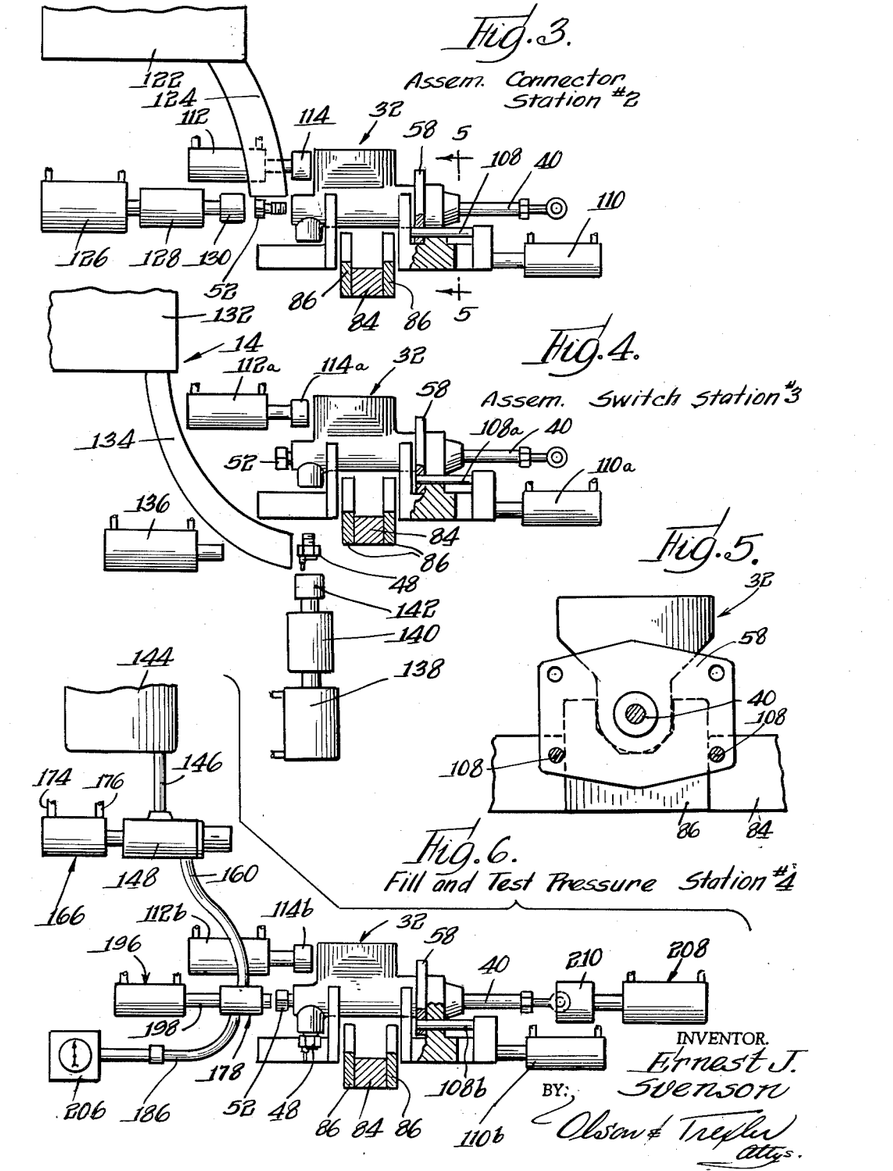
FIG. 3 is an enlarged somewhat diagrammatic illustration of Station #2 wherein a feeding hopper and chute of conventional design are employed to direct connectors into proper position for assembly with the brake cylinder.
FIG. 4 is a view similar to FIG. 3, illustrating the manner in which pressure switch elements are fed into position for assembly with the master cylinder at Station #3.
FIG. 5 is a vertical sectional view taken substantially along the line 5—5 of FIG. 3 more clearly to illustrate the manner in which the master cylinder is clamped in position on the conveyor.
FIG. 6 is a semi-diagrammatic illustration of Station #4, at which location the master cylinder is filled with oil and pressure-tested.

With the two units 32 thus positioned at Station #1, they are now ready to be shifted to Station #2, FIGS. 1 and 3. This may be accomplished by the conveyor mechanism shown in FIG. 19. This conveyor mechanism consists of a longitudinally extending bar or member 84, which supports a plurality of equally spaced cradles 86. These cradles are shaped to accommodate the underside of the master cylinder casting 34. The bar 84 is reciprocated through the agency of a hydraulic actuator 88, FIG. 19, which is connected to the bar or member 84 by a link 90 and an arm 92 depending from the member 84. Simultaneously, with the reciprocation of the member 84, rollers 94–96 operate to raise and lower said member. These rollers 94–96 operate to raise and lower said member. These rollers 94–96 are shifted from the lowermost solid line position shown in FIG. 19, to the upper dot-and-dash position by bell cranks 98–100, pivotally coupled with a bar 102, and this bar 102 is, in turn, pivotally connected with the piston rod of a hydraulic actuator 104 by a link member 106. Thus, the master cylinder units at Station #1 are raised sufficiently to disengage them from the recesses in the fixed bars 76 and then advanced and lowered into another set of similar recesses in the bars 76 at Station #2. This method of raising, advancing and lowering the units 32 is repeated until the end of the assembly and testing line has been reached. The proper timed functioning of the conveyor mechanism just described is accomplished by conventional control means.

*Station #2*

At Station #2 (see FIGS. 1 and 3), locating pins 108 are moved into registration with apertures in the flanges 58 under the influence of a hydraulic actuator 110. Contemporaneously, with this insertion of the locating pins 108, an actuator 112 functions to bring clamping members 114 (see FIG. 27) into engagement with the units 32 so as to urge the flanges 58 of said units against the aforesaid plate 82. This clamping structure is similar to the clamping devices used at subsequent stations, and it will suffice at this point of the description to state that each such device incorporates a yoke member 116 (FIG. 27) which pivotally supports a clamping member of a shoe 114 at each extremity. The mid-point of this yoke member 116 has a pivoted connection with a member 118 which, in turn, is coupled with the actuator 112. To facilitate in maintaining the yoke member 116 in substantially normal relation with respect to the axis of the actuator 112, a pair of guide members 120 are provided (FIGS. 27 and 29). By means of the arrangement just described, the clamping force of the members or shoes 114 is equally applied to both units 32.

With the units 32 thus properly located by the pins 108 and the clamping members 114, said units are in readiness to receive the connector members 52. These may be fed from a conventional hopper 122, through a chute 124 to the position shown in FIG. 3. When the connector members are thus positioned, a hydraulic actuator functions to advance a conventional torque wrench 128, having a suitable chuck 130, into engagement with the head of the connector member 52. The wrench rotates the member 52 so as to screw it into a complementary threaded aperture of the unit 32. The actuator is controlled in its forward movement so as to axially shift the wrench a predetermined amount whereby to accurately position the connector member 52.

*Station #3*

With the connector member 52 properly assembled with the units 32, said units are now ready to be shifted to Station #3. This is accomplished by the conveyor mechanism previously described after the clamping members 114 have been released, the locating pins withdrawn and the wrench device 130 has disengaged from the connector member 52. At Station #3 (see FIGS. 1 and 4) pressure responsive switch members are directed from a suitable hopper 132 through a chute 134 to the position shown in FIG. 4. It should be understood that work clamping mechanism and locating pins, identical with the mechanism described in connection with Station #2, operate at Station #3 to properly position the units 32 for receiving the switch members 48. The duplicated elements in FIG. 4 are identified by corresponding numerals bearing the suffix (*a*). Hydrualic actuators 136 are employed to transfer the switch members 48 from the bottom of the chute to the position shown in FIG. 4.

With the switch members 48 thus positioned, a hydraulic actuator 138 functions to shift a suitable wrench mechanism 140 so as to bring a rotating chuck 142 into driving association with the periphery of the pressure switch member 48. In this manner, the member 48 is tightened in position. After the chuck 142 has been disengaged, the locating pins 108*a* withdrawn, and the clamps 114*a* released, the units 32 are then shifted to Station #4.

*Station #4*

Figure 16:
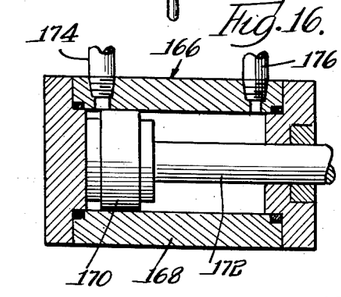
FIG. 16 is a central longitudinal sectional view disclosing the type of hydraulic actuator employed in various stations for shifting parts to be assembled.
Figure 17:
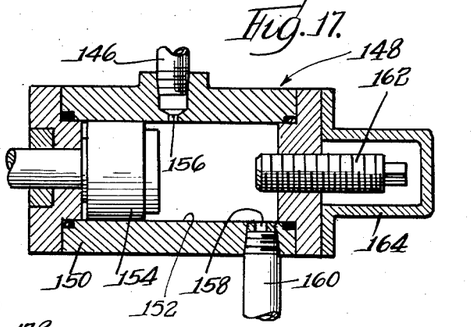
FIG. 17 is a central longitudinal sectional view of a fluid metering device employed in one the stations.
Figure 18:
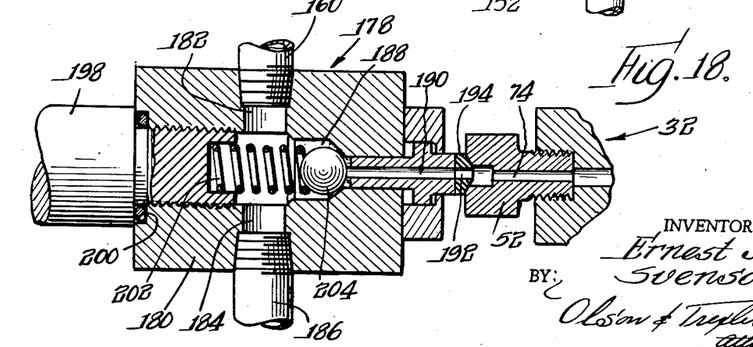
FIG. 18 is a central longitudinal sectional view of the valve arrangement for controlling fluid connection between the fluid reservoir and the master cylinder.
Figures 19, 20, 21:
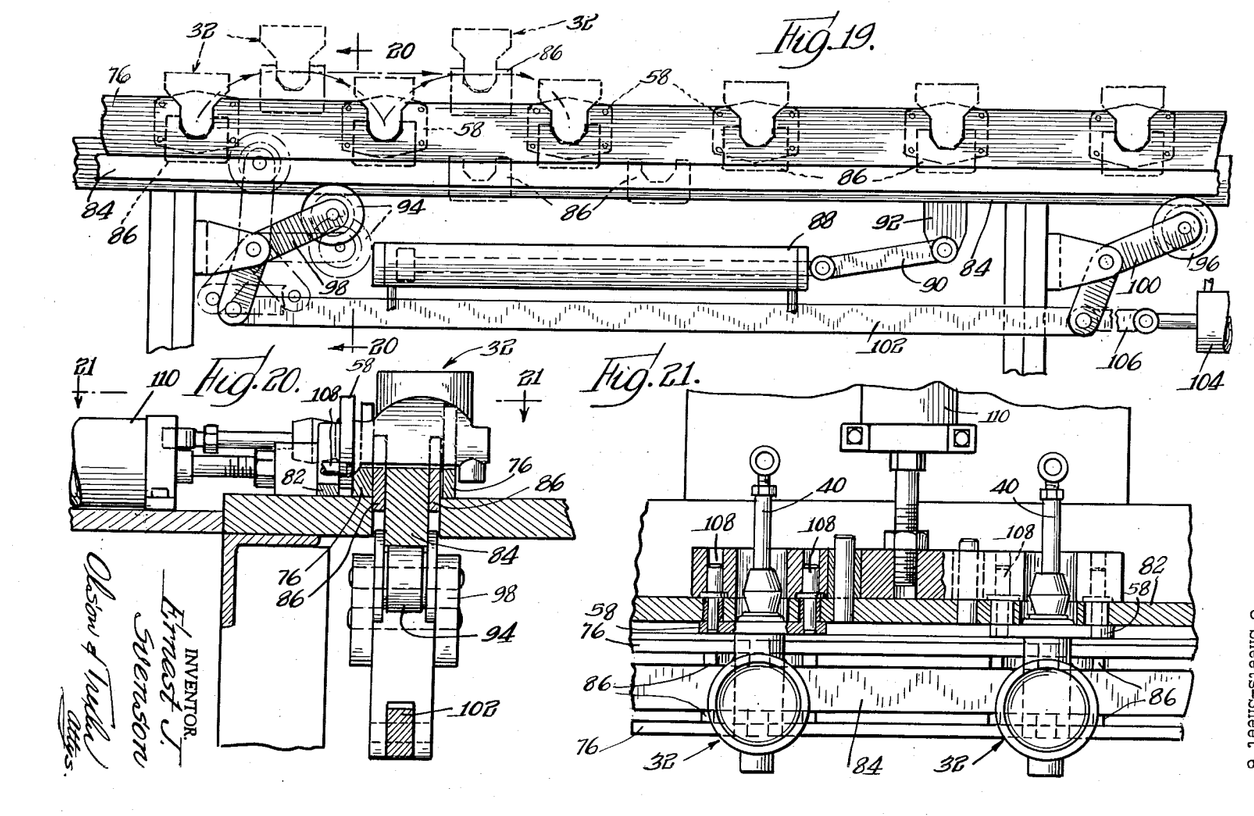
FIG. 19 is a fragmentary front elevational view of the conveyor mechanism to more clearly illustrate the manner in which master brake cylinders are moved from one position to another.
FIG. 20 is a vertical sectional view of the conveyor mechanism taken substantially along the line 20—20 of FIG. 19.
FIG. 21 is a horizontal sectional view taken substantially along the line 21—21 of FIG. 20, the work part of master cylinder being shown in elevation.

At Station #4 (see FIGS. 1 and 6) the units 32 are again located by similar pins 108*b* and secured in position by clamps 114*b*, as previously described, with respect to Stations #2 and #3. At Station #4, brake fluid stored in a reservoir 144 is supplied to the units 32 in the following manner: Brake fluid from the reservoir 144 is directed through a conduit 146 to a metering device 148. This metering device is shown somewhat in detail in the cross-sectional view of FIG. 17. A cylinder 150 provides a metering chamber 152 as fluid from this chamber is discharged by the forward or advancing movement of a piston 154. As the piston initially advances, a port 156 is closed and the remaining fluid is discharged through a port 158 and a conduit 160. The extent of advancement or stroke of the piston 154 is determined by an adjustable stop or abutment screw 162 protected by a housing 164. The movement of the piston 154 is occasioned by a hydraulic actuator 166, FIGS. 6 and 16. This actuator 166 includes a cylinder 168, a piston 170 and a piston rod 172, which connects the piston 170 with the aforementioned piston 154. Suitable conduits 174 and 176 permit the flow of propelling fluid into and out of the cylinder 168. Thus, the metering device 148 directs a predetermined volume of brake fluid into a fluid filling and sealing means 178, FIGS. 6 and 18. This filling and sealing means 178 includes a housing 180 having a port 182 communicating with the conduit 160, a port 184 communicating with a conduit 186 and a port 188 having restricted communication with a passage 190. The outer extremity of this passage 190 communicates with a passage 192 in a sealing connector element 194 as shown in FIG. 18. This sealing connector element 194 is maintained in sealing contact with the outer extremity of the connector member 52, as shown in FIG. 18, by a hydraulic actuator 196, which is connected with the housing 180 by a connecting rod 198. To preclude leakage of fluid at the point where the connecting rod makes a threaded connection with the housing 180, a conventional sealing ring 200 is employed. It will be noted that the housing 180 also retains a coiled spring 202 which continuously urges a ball valve member 204 toward its seated position as illustrated in FIG. 18. The conduit 186 is connected with a fluid pressure indicating device or gauge 206.

From the foregoing, it will be understood that when the units 32 are secured in proper position at Station #4, the actuator 196 advances the housing 180 so as to bring the sealing tip 194 into sealing engagement with the outer apertured extremity of the connector member 52. Forward movement of the piston 154 in the metering device causes the proper amount of brake fluid to be directed into the compression chamber 36 of the master brake cylinder 34. When this compression chamber has been filled, hydraulic actuators 208, FIG. 6, causes the forward movement of members 210 connected with the outer extremities of the piston rods 40 of the units 32. This forward advancement of the actuators 208 simulates the forward movement resulting from the actuation of a brake pedal in an automobile. As the piston rods 40 move to the left, FIG. 6, brake fluid within the compression chamber 36 and, consequently, within the housing 180, is increased. The amount of pressure is indicated by the gauge 206. If this pressure is not within the required limits, the defective master brake cylinder units must be rejected in a manner about to be described. Upon completion of the above described test, the units are unclamped, as previously described, and the hydraulic actuators 196 and 208 function to retract the devices 178 and 210, respectively. The units are then shifted in the manner previously described to Station #5, which is designated as a reject station. (See FIGS. 1 and 7).

*Station #5*

Figures 7, 8:
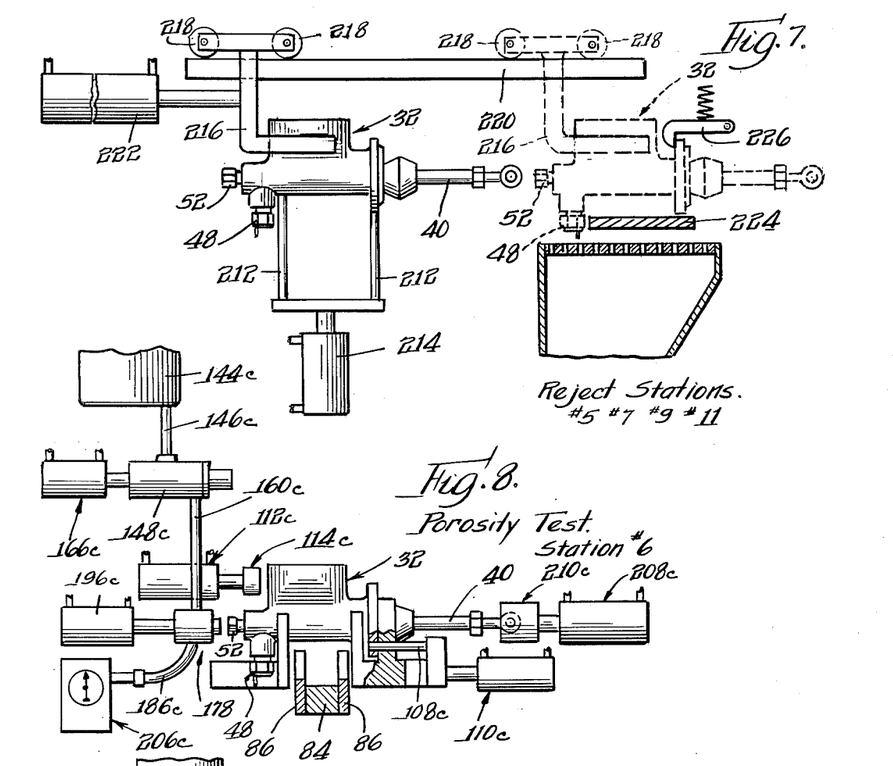
FIG. 7 illustrates the manner in which a defective master brake cylinder is rejected and shifted out of the normal path of conveyor movement, this rejection operation being employed at Stations #5, #7, #9, and #11.
FIG. 8 illustrates the mechanism for performing the porosity test at Station #6.

A description of the reject mechanism of Station #5 will suffice for succeeding reject stations, namely, Stations #7, #9, and #11. All of these stations are structurally similar and function in the same manner to remove from the assembly and testing line defective brake cylinder units. The reject mechanism consists of vertically disposed ejector pins 212, FIG. 7. These pins are adapted to be elevated through the agency of a hydraulic actuator 214. If the pressure gauge 206 indicates pressure conditions outside of the range tolerance, a conventional control device (not shown) conditions the hydraulic actuator 214 for elevating the defective unit 32 sufficiently to permit a pusher member 216 to shift the unit from the solid line position to the dotted line position shown in FIG. 7. The action of the hydraulic actuator 214 is timed to lift the unit 32 to be rejected above the path of the shifting elements of the conveyor mechanism before the conveyor operates to shift the units to the succeeding stations. This pusher member may be supported by rollers 218 movable along a guide rail 220, and shifting of the pusher members 216 is caused by a hydraulic actuator 222. As the rejected unit 32 is shifted to the right as illustrated in FIG. 7, it finally is brought to rest on a suitable shift 224, and is held in this position by a latch member 226. Obviously if the pressure gauge 206 indicated pressure conditions within the range of tolerance the hydraulic actuator 214 does not function and hence the cylinder unit 32 continues along its predetermined path to the next Station #6.

Station #6

Station #6 is referred to as the porosity test station and is shown more in detail in FIG. 8. At this station the cylinder unit 32 is clamped in position in the manner previously described. Parts disclosed in FIG. 8 which correspond structurally and functionally to those illustrated are given corresponding numerals bearing the suffix (c). The testing mechanism shown at the left in FIG. 8 is substantially the same as the mechanism disclosed in FIG. 6. Thus brake fluid is stored in a suitable reservoir 144c, and fluid from this reservoir is directed through a conduit 146c to a metering device 148c as previously described. Details of the metering device 148c, the actuator 166c and the fluid filling and sealing means 178c have been previously described and are shown in detail in FIGS. 16, 17 and 18, respectively. A pressure drop indicator 206c serves to indicate the amount of fluid leakage after the fluid within the brake cylinder has been subjected to predetermined pressure. If the indicator 206c shows a drop in pressure beyond a given amount the cylinder is subject to rejection at the next Station #7. On the other hand, if the pressure drop is within the prescribed minimum the cylinder unit is not subject to rejection. The indicator 206c may be connected in any conventional manner (not shown) to control the functioning of the actuator cylinder 214 at the reject Station #7. The operation of the reject Station #7 is similar to Station #5 previously described and therefore no further description is necessary in order to understand its structural and functional characteristics.

Station #8

Figure 9:
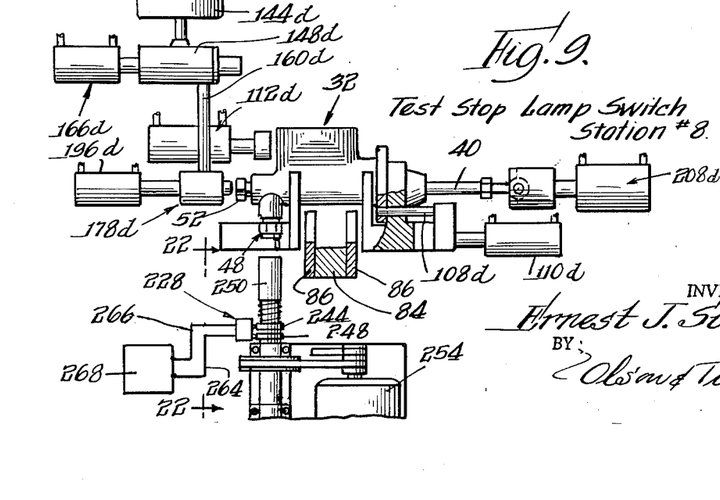
FIG. 9 illustrates the mechanism for testing the stop lamp switch at Station #8.
Figures 22, 23, 24, 25, 26:
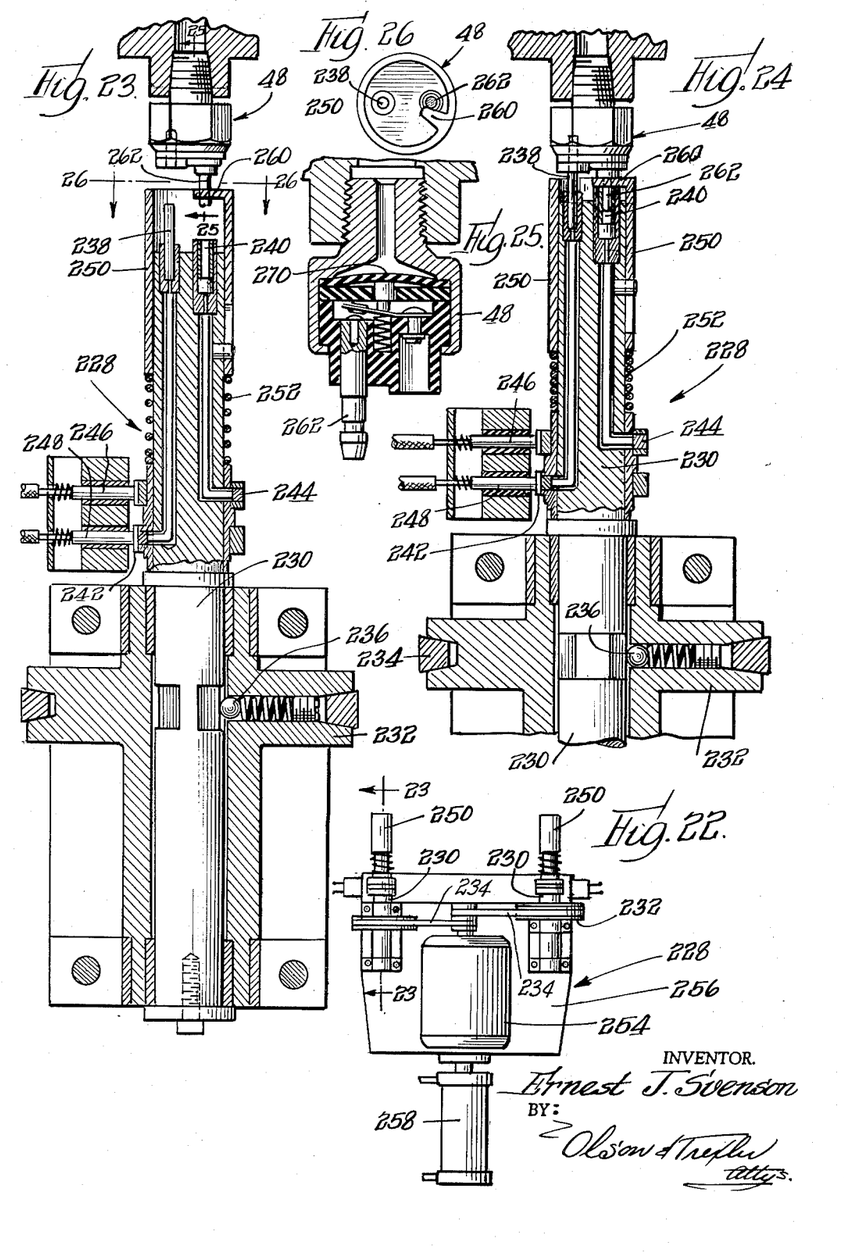
FIG. 22 is a fragmentary vertical sectional view taken substantially along the line 22—22 of FIG. 1 more clearly to illustrate the combination of the hydraulic actuator and motor-driven mechanisms for testing the stop lamp switch.
FIG. 23 is an enlarged vertical sectional view of the rotatable mechanism for testing the stop lamp switch, said view being taken substantially along the line 23—23 of FIG. 22.
FIG. 24 is a fragmentary vertical sectional view similar to FIG. 23, disclosing the position occupied by the electrical contacts after the rotary mechanism has been brought into proper registration with the depending pin of the switch.
FIG. 25 is an enlarged central vertical sectional view of the stop lamp switch taken substantially along the line 25—25 of FIG. 23.
FIG. 26 is a plan view of the upper end of the rotary switch testing mechanism illustrated in FIGS. 23 and 24, said view taken substantially along the line 26—26 of FIG. 23.

If the cylinder unit meets the requirements of the porosity test at Station #6 it is ultimately directed to Station #8 (FIG. 9) for the purpose of testing the stop lamp switch 48. At Station #8 the cylinder unit is clamped in the manner previously described. Also, as previously described, brake fluid is introduced from the reservoir 144d into the brake cylinder chamber and the unit is sealed. The purpose of the testing at this station is to check the operation of the pressure switch 48. The mechanism for testing the switch is designated generally by the numeral 228. This mechanism is shown more in detail in FIGS. 22 to 24 inclusive. It will be apparent from the foregoing description that the previously described tests involve the simultaneous testing of a pair of cylinder units as indicated in FIG. 1. Likewise, at Station #8 the stop lamp switch on each of the two cylinder units is tested in one operation. Referring particularly to FIGS. 23 to 24, it will be seen that the mechanism 228 includes a rotary shaft 230 driven from a pulley 232 through the agency of a suitable V-belt 234. The pulley 232 is impositively coupled with the shaft 230 by a spring pressed ball 236 urged into association with the recessed portion of the shaft. The upper extremity of the shaft 230 carries a pair of contact members 238 and 240 electrically coupled with contact rings 242 and 244, respectively. These rings 242 and 244 may contact with spring pressed contact elements 246 and 248, respectively. The upper extremity of the shaft 230 is encircled by a sleeve 250 which is supported by a coiled spring 252. The entire unit consisting of a pair of rotatable shafts 230 and sleeve 250 (FIG. 22) is driven from an electric motor 254 carried by a frame 256. The entire frame and motor may be raised and lowered through the agency of a hydraulic actuator 258. It will be understood that the actuator 258 is operated to raise the frame 256 after the two units to be tested have been clamped in Station #8. The sleeve 250 forms a positioning mechanism in the nature of a slip clutch. As the sleeves 250 are elevated and rotated the advancing ends thereof move into association with the switch member 48 and when a section 260 is rotated into engagement with the depending contact element 262 of the switch 48 the pulley 232 will continue to rotate without causing further rotation of the shaft 230 and its associated sleeve 250. As the contacts 240 and 238 move from the position shown in FIG. 23 to the position shown in FIG. 24, a circuit is completed through conductors 264–266 (FIG. 9), with a test unit 268. Pressure is developed in the pressure cylinder by the operation of fluid supply and piston actuating structure previously described in relation to Stations #4 and #6. If the switch is in proper operating condition, the pressure within the brake cylinder will close the circuit. If the switch does not operate under the required pressure condition the next succeeding reject station is conditioned to reject the cylinder unit. A detailed disclosure of the interior of the pressure actuated switch 48 is disclosed in FIG. 25. Inasmuch as the present invention is not concerned with the details of the switch, it will suffice to say that fluid pressure within the actuator cylinder is exerted against a diaphragm 270 to operate the contact within the switch. After the hydraulic actuator 258 has lowered the structure just described and disengaged the contacts 238–240 from the switch 48, the cylinder units are now free to be advanced to the reject Station #9. This reject station is structurally and functionally similar to the previously described reject Stations #5 and #7. Suitable control means (not shown) may be employed to operate the reject mechanism in response to the functioning of the indicator mechanism 268 diagarmmatically illustrated in FIG. 9.

Station #10

Figure 10:
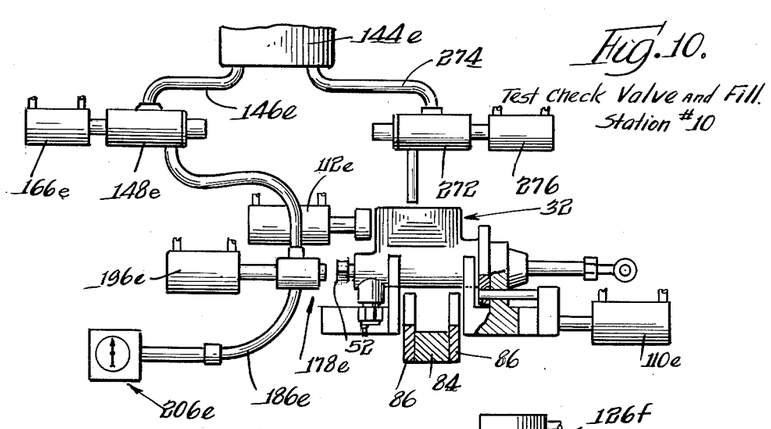
FIG. 10 discloses Station #10, at which the check valve is tested and cylinder filled.

At Station #10 the brake cylinder units are filled with brake fluid and subjected to a check valve test. Station #10 is disclosed in FIG. 10 and incorporates many of the structural features previously described with reference to Station #4 and FIG. 6. The structural features in FIG. 10 which correspond with the previously described corresponding structures are given the same numbers bearing the suffix (e). Thus, the reservoir 144e is connected with a metering device 148e through a conduit 146e. Metering device 148e is controlled by a hydraulic actuator mechanism 166c. A second metering device 272 connected with the reservoir 144e by a conduit 274 is controlled by a hydraulic actuator 276. This metering device 272 operates to assure complete filling of the chamber 54 (FIG. 14) of the brake cylinder structure. As previously described the metering device 148e and associated mechanism serves to insure delivery of a complete supply of brake fluid to the pressure chamber 36 of the brake cylinder unit. The mechanism 178e functions similarly to the previously described mechanism 178 in establishing a sealed coupling with the threaded connector member 52 (see FIG. 18). A suitable indicator device 206e connected to the sealing and check valve mechanism 178e through a conduit 186e serves to check the maximum pressure developed within the chamber 50 of the brake cylinder (FIG. 14). In this station the piston 38 is moved in a direction for contracting the space in the cylinder 36 by piston actuating means in Station #10 which is similar to the previously described piston actuating means used in Station #4, FIG. 6. This piston actuating means is duplicated in Stations #4, 6, 8 and 10 and need not be repeatedly described for each of these stations. It will be understood that the metering device 148e operates through the mechanism 178e to fill the cylinder 36 and that the metering device 272 operates to fill the reservoir 54 before the piston 38 is advanced. As the piston 38 in the brake cylinder is advanced pressure is developed within the chamber 36 and when this pressure is sufficient the check valve 46 (FIGS. 14 and 15) opens and permits this pressure to be exerted within the chamber or area 50. It is the pressure within the area 50 which operates the previously described lamp switch 48. Thus when the brake cylinder is used in an automobile and the operator presses against the foot pedal connected to the shaft 40, fluid pressure is developed to operate the brakes on the automobile and simultaneously the switch 48 is actuated to indicate by rear red lights that the brakes are being applied. It is therefore important that the check valve 46 function properly to establish the maximum pressure required to apply the brakes and consequently to accommodate the lamp switch 48. If the maximum pressure is not established as shown by the indicator 206e, the master cylinder unit when shifted to Station #11 is rejected in the manner previously described. It will be understood that the units 32 are not shifted from the various assembly and test stations to the next successive stations until the assembly and test operations performed at the respective stations are completed.

*Station #12*

Figures 11, 12, 13:
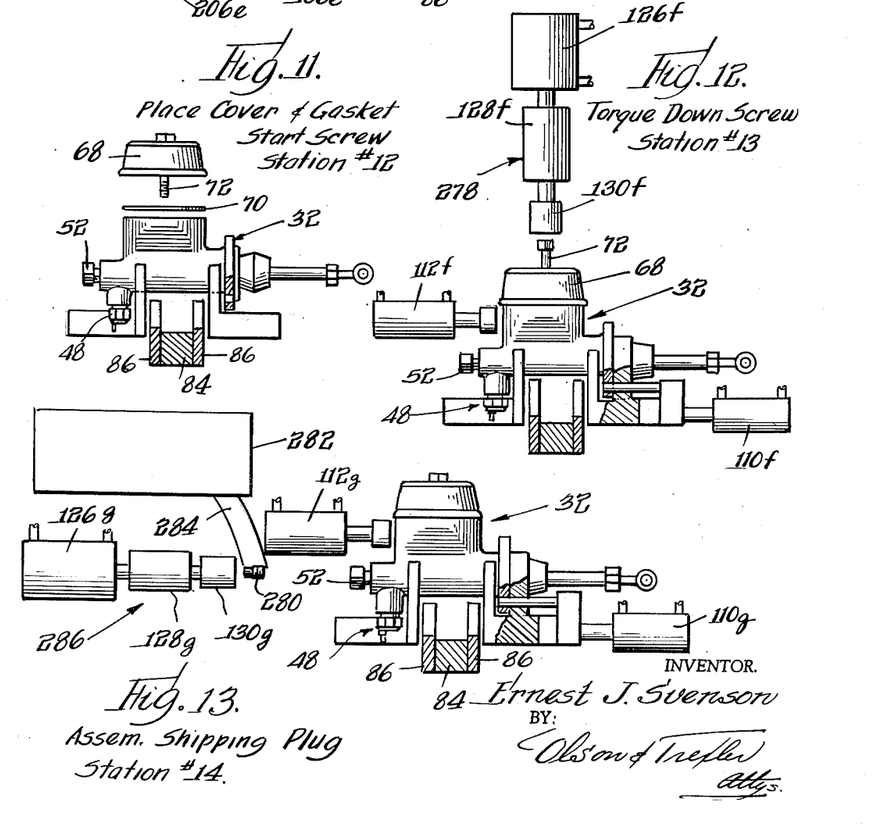
FIG. 11 illustrates Station #12, at which location the cover, gasket and clamping screw therefor are brought into association with the brake cylinder.
FIG. 12 illustrates the manner in which torque is applied at Station #13 for clamping the cover and gasket against the brake cylinder.
FIG. 13 discloses Station #14, at which location the shipping plug is assembled with the master brake cylinder unit.

From the reject Station #11 brake cylinder units which meet the maximum pressure test at Station #10 are shifted to Station #12 as illustrated in FIG. 11. While a unit is located in a stationary position in this station, the cover 68, gasket 70 and screw 72 are manually applied in the position shown in FIG. 14. At this point both the compression chamber 36 and the reservoir chamber 54 of the brake cylinder unit are filled with brake fluid and the previous tests for switch operation, pressure, porosity, leakage and check valve have been completed.

*Station #13*

At Station #13 (FIG. 12) the screw 72 which was applied manually at Station #12 is given its final tightening. This is accomplished by the mechanism designated generally by the numeral 278 (FIG. 12). This device consists of a conventional torque-applying wrench similar to the device shown in FIG. 3 for applying the screw element 52. This torque device 278 includes an actuator 126f and a conventional torque wrench 128f and a screw head engaging chuck 130f. After the cylinder unit 32 has been clamped in position as previously described the torque applying device 278 is actuated to bring the clutch 130f thereof into engagement with the head of the screw 72 and thus the cover 68 and gasket 70 are properly clamped in position.

*Station #14*

From Station #13 the brake cylinder unit is shifted to Station #14 (see FIG. 13). At Station #14 a plug 280 is directed from a suitable hopper 282 through a chute 284 to the position illustrated in FIG. 13. After the cylinder unit has been properly clamped in place as previously described, a torque-applying device designated generally by the numeral 286 which is similar in structural characteristics to the previously described torque-applying device 278 functions to advance the plug 280 and apply it to the internally threaded aperture in the screw connector 52. Like the torque-applying device 278, the device 286 consists primarily of a hydraulic actuator 126g, a torque wrench 128g, and a clutch 130g. With the plug 280 applied to the cylinder unit this unit may now be shipped without any danger of leakage of brake fluid. Thus, from Station #14 the completely assembled brake cylinder unit may be shifted to Station #15 where accumulated foreign matter may be blown off and cleaning fluid sprayed in any suitable manner. The cylinder unit is now ready for delivery to the final unloading Station #16 where it is removed for purposes of shipment.

From the foregoing, it will be apparent that the present invention contemplates a very simple method and apparatus for assembling and testing master brake cylinder units. By conveying the cylinder structure proper along a predetermined path from station to station, the assembling, testing, rejecting, etc., may be carried out expeditiously with a minimum of effort and skill on the part of an operator.

The present invention reduces to a minimum the time and effort heretofore required to assemble and test master brake cylinder units. In this day of production line methods, as for example those employed in the automotive industry, it is extremely important that the various units which form components of the completed automobile assembly be preassembled and tested before actually being brought into the final line of assembly. The present invention accomplishes this economically and speedily. The specific structural details employed in the practice of the improved method of assembly should be understood as being only illustrative. Obviously, the invention is not limited to the specifically disclosed structural arrangements but contemplates other structures and arrangements without departing from the spirit and scope of the appended claims.

The invention is claimed as follows:

1. The method of assembling and testing master brake cylinder units which includes the steps of securing the cylinder proper in a predetermined position, applying a connector member to said cylinder by imparting axial and rotary movement to said member, releasing the cylinder and shifting said cylinder and assembled member along a predetermined path to a given station, securing said cylinder in a predetermined position at said station, applying a pressure responsive switch member thereto, releasing said cylinder and shifting the assembled parts to another station along said predetermined path, filling the cylinder with brake fluid and subjecting said fluid to pressure conditions by moving the master brake cylinder piston, testing the operational characteristics of said unit at other stations positioned along said predetermined path, shifting defective units out of said predetermined path, and finally delivering units in tested state at a given location.

2. The method of assembling and testing master brake cylinder units which includes the steps of securing the cylinder proper in a predetermined position, applying a connector member to said cylinder by imparting axial and rotary movement to said member, releasing the cylinder and shifting said cylinder and assembled member along a predetermined path to a given station, securing said cylinder in a predetermined position at said station, applying a pressure responsive switch member thereto, releasing said cylinder and shifting the assembled parts to another station along said predetermined path, filling the cylinder with brake fluid and subjecting said fluid to pressure conditions by moving the master brake cylinder piston, checking resulting fluid pressure, releasing the cylinder and shifting same along said predetermined path to another station, at said latter station dislodging from said predetermined path cylinders which did not meet fluid pressure standards in previous test, testing the operational characteristics of said unit at other stations positioned along said predetermined path, shifting defective units out of said predetermined path, and finally delivering units in tested state at a given location.

3. The method of assembling and testing master brake cylinder units which includes the steps of securing the cylinder proper in a predetermined position, applying a connector member to said cylinder by imparting axial and rotary movement to said member, releasing the cylinder and shifting said cylinder and assembled member along a predetermined path to a given station, securing said cylinder in a predetermined position at said station, applying a pressure responsive switch member thereto, releasing said cylinder and shifting the assembled parts to another station along said predetermined path, filling the cylinder with brake fluid and subjecting said fluid to pressure conditions by moving the master brake cylinder piston, checking resulting fluid pressure, releasing the cylinder and shifting same along said predetermined path to another station, at said latter station dislodging from said predetermined path cylinders which did not meet fluid pressure standards in the previous test, shifting satisfactorily tested cylinders to another station along said predetermined path, subjecting said cylinder to fluid pressure test for detecting fluid leakage, dislodging cylinders from said predetermined path which do not meet standards of leagage test, testing the operational characteristics of said unit at other stations positioned along said predetermined path, shifting defective units out of said predetermined path, and finally delivering units in tested state at a given location.

4. The method of assembling and testing master brake cylinder units which includes the steps of securing the cylinder proper in a predetermined position, applying a connector member to said cylinder by imparting axial and rotary movement to said member, releasing the cylinder and shifting said cylinder and assembled member along a predetermined path to a given station, securing said cylinder in a predetermined position at said station, applying a pressure responsive switch member thereto, releasing said cylinder and shifting the assembled parts to another station along said predetermined path, filling the cylinder with brake fluid and subjecting said fluid to pressure conditions by moving the master brake cylinder piston, testing previously assembled pressure responsive switch, at other stations along said predetermined path testing operational characteristics of said unit, shifting defective units out of said predetermined path, and finally delivering units in tested state at a given location.

5. The method of assembling and testing master brake cylinder units which includes the steps of securing the cylinder proper in a predetermined position, applying a connector member to said cylinder by imparting axial and rotary movement to said member, releasing the cylinder and shifting said cylinder and assembled member along a predetermined path to a given station, securing said cylinder in a predetermined position at said station, applying a pressure responsive switch member thereto, releasing said cylinder and shifting the assembled parts to another station along said predetermined path, filling the cylinder with brake fluid and subjecting said fluid to pressure conditions by moving the master brake cylinder piston, shifting said cylinder to another station along said predetermined path, securing said cylinder in predetermined position and testing said previously assembled pressure responsive switch, dislodging cylinders from said predetermined path which do not meet the standards for switch test, shifting the cylinder to another station along said predetermined path, filling the cylinder with brake fluid and testing operation of check valve in the cylinder, rejecting cylinders which do not meet the standards of the check valve test, shifting the cylinder to another station along said predetermined path, applying cover gasket and clamping screw at said latter station, and then applying a shipping plug to the cylinders and removing the completely assembled and tested master brake cylinder units from said predetermined path.

6. The method of assembling and testing master brake cylinder units which includes the steps of securing the cylinder proper in a predetermined position, applying a connector member to said cylinder by imparting axial and rotary movement to said member, releasing the cylinder and shifting said cylinder and assembled member along a predetermined path to a given station, securing said cylinder in a predetermined position at said station, applying a pressure responsive switch member thereto, releasing said cylinder and shifting the assembled parts to another station along said predetermined path, filling the cylinder with brake fluid and subjecting said fluid to pressure conditions by moving the master brake cylinder piston, checking resulting fluid pressure, releasing the cylinder and shifting same along said predetermined path to another station, at said latter station dislodging from said predetermined path cylinders which did not meet fluid pressure standards in previous test, shifting satisfactorily tested cylinders to another station along said predetermined path, subjecting said cylinder to fluid pressure test for detecting fluid leakage, dislodging cylinders from said predetermined path which do not meet standards of leakage test, shifting cylinder to another station along said predetermined path, securing cylinder in predetermined position and testing previously assembled pressure responsive switch, dislodging cylinders from said predetermined path which do not meet the standards for the switch test, shifting the cylinder to another station along said predetermined path, filling the cylinder with brake fluid and testing operation of check valve in cylinder, rejecting cylinders which do not meet the standards of the check valve test, shifting cylinder to another station along said predetermined path, applying cover gasket and clamping screw at said latter station, and then applying a shipping plug to the cylinders and removing the completely assembled and tested master brake cylinder units from said predetermined path.

7. The method of assembling and testing master brake cylinder units formed of housing means, fluid actuator means, valve means and pressure responsive switch means, which method includes the steps of intermittently moving cylinder housing means along a predetermined path from one station to another, securing the cylinder housing means during a dwell at certain of the stations, assembling parts with said housing means at some of the stations during said dwell, delivering a predetermined amount of brake fluid to said housing means at certain of said stations, testing the operational characteristics of the unit at certain of said stations, rejecting defective units by shifting said units out of said predetermined path, applying a sealing plug to prevent leakage of brake fluid during transportation of the unit, and finally delivering units in completed and tested state at a given location.

8. Apparatus for assembling and testing master brake cylinder units, comprising, in combination; a series of master brake cylinder holders defining a sequence of assembly, testing, and reject stations; indexing means for transferring brake cylinders to successive ones of said stations, power operated clamping means mounted at each of said assembly stations and each of said testing stations to clamp brake cylinders in the cylinder holders of said respective stations, threaded connector feeding means located at one of said assembly stations, power operated torque means and power operated advancing means therefor located at said one assembly station for threading connector elements into brake cylinders in said one assembly station, a testing station succeeding said one assembly station constituting a hydrostatic testing station including liquid metering means and injecting means coacting with said metering means for injecting liquid into brake cylinders in the hydrostatic testing station, fluid pressure sensing means connected to respond to the hydrostatic pressure of fluid injected by injecting means, another of said assembly stations constituting a pressure switch assembly station, pressure switch feeding means at said switch assembly station, power operated torque means and power advancing means therefor located at said switch assembly station to thread switches into brake cylinders in the switch assembly station, another of said testing stations succeeding said switch assembly station and constituting a switch testing station, fluid pressure developing means at said switch testing station, a rotary contact holder, male and female contacts mounted in said holder in spaced relation to each other, power means for rotating said holder, means for advancing said holder, switch engaging rotary stop means on said holder, brake cylinder reject lifting means mounted at each of the reject stations to shift defective structures out of the reject stations, and transfer means mounted at each of the reject stations to receive and move away from each reject station defective structures lifted from the reject station by the coacting reject lifting means.

9. Apparatus for assembling and testing master brake cylinder units, comprising, in combination, a pair of longitudinal supports mounted horizontally in laterally spaced relation to each other, said supports defining a longitudinal series of pairs of cylinder supporting receivers, a transfer bar mounted between said supports, a plurality of cradle elements mounted on said bar for lifting cylinders from said receivers, lifting means coacting with said bar for periodically moving the latter from a normal position to a cylinder lifting position, shifting means coacting with said bar to reciprocate the latter to shift the cylinders to successive receivers, a pair of said receivers defining an assembly station, a component supplying element at said assembly station, power operated component assembling device at said assembly station and including torque applying means, a pair of said receivers defining a hydrostatic testing station, liquid metering means at said testing station, liquid injecting means coacting with said metering means and including sealing means for injecting a metered volume of liquid into a cylinder, power operated piston actuating means at said testing station, pressure responsive means connected to respond to the hydrostatic pressure of liquid injected into a cylinder from said injecting means, a pair of said receivers defining a switch assembly station, fluid pressure switch feeding means at said switch assembly station, power operated torque means at said switch assembly station including means for threading pressure switches into brake cylinders in said switch assembly station, a pair of said receivers defining a switch testing station, a rotary contact holder at said switch testing station, a male contact and a female contact mounted on said contact holder in spaced relation to each other, power means for rotating said contact holder, power means for advancing said contact holder into testing position, a switch engaging stop on said contact holder, power operated cylinder unit actuating means in said switch testing station, power operated cylinder clamping means operatively mounted at each of said assembly stations and at each of said testing stations, a reject station located proximate to each of said testing stations, each of said reject stations being defined by a pair of said receivers, power lifting means at each reject station for shifting a cylinder upwardly from the receivers defining said station, elevated track means overlying each reject station, transfer means carried by said track means, and means for operating the transfer means to remove a cylinder from the adjacent reject station.

10. Brake cylinder assembly and testing apparatus, comprising, in combination, means defining a series of brake cylinder holders, power clamping means associated with each of said holders to clamp brake cylinders therein, power transfer means associated with said holders to transfer brake cylinders to said holders in succession, one of said holders defining a connector assembly station, connector feeding means located at said assembly station, power operated torque means and power advancing means therefor, connector threading means at said assembly station operated by said torque means for assembling connectors into cylinders in said assembly station, another of said holders defining a hydrostatic testing station, liquid metering means for said testing station, said metering means including a liquid measuring cylinder and a piston for displacing liquid from said cylinder, power operating means for said piston, liquid injecting means located at said testing station and including a liquid injecting nozzle connected with said metering cylinder, power operating means connected with said nozzle to advance the latter into engagement with a connector in said testing station, and pressure sensing means interconnected with said nozzle to sense the hydrostatic pressure of liquid injected through a connector in said testing station.

11. In master brake cylinder assembly and testing apparatus, the combination of a series of brake cylinder holders, power operated clamping means coacting with each of said holders to clamp a brake cylinder therein, transfer means for moving brake cylinders into said holders in succession, one of said holders defining a cylinder and switch assembling station, pressure switch feeding means located at said assembly station, power operated torque means and power operated advancing means therefor located at said assembly station, switch holding means operated by said torque means to thread into brake cylinders pressure switches supplied from said switch feeding means, another of said holders defining a pressure switch testing station, a rotary contact holder mounted adjacent said testing station, power means for advancing and retracting said contact holder, power means connected to rotate said contact holder, male and female contacts supported on said holder in spaced relation to each other, and switch engaging stop means on said holder for terminating rotation of said holder upon advancing of the latter to align said contacts with a switch in said testing station.

12. Brake cylinder assembly and testing apparatus, comprising, in combination, means defining a series of brake cylinder stations, power transfer means for transferring brake cylinders to said stations in succession, one of said stations constituting a connector assembly station, connector feeding means located at said assembly station, power operated driving means and power control means therefor, connector holding means operated by said driving means for assembling connectors from said feeding means into cylinders in said assembly station, another of said stations constituting a hydrostatic testing station, liquid dispensing means located at said testing station for supplying liquid to brake cylinders in said testing station, mechanical brake unit actuating means operatively positioned at said testing station, and hydrostatic pressure sensing means associated with said testing station for sensing the pressure of fluid in brake cylinders in the testing station.

13. In apparatus for assembling and testing master brake cylinder units, the combination of two laterally spaced support structures defining a series of cylinder holders, a transfer element mounted between said supports, a plurality of cradle elements mounted on said transfer element for lifting cylinders from said holders, operating means coacting with said transfer element to periodically move the latter from a lower position to an upper cylinder supporting position and to move the transfer element longitudinally to shift the cylinders to successive holders, one of said holders defining an assembly station, component supplying means at said assembly station, power operated component assembling means at said assembly station, another of said holders defining a hydrostatic testing station, power operated liquid dispensing means at said testing station for supplying liquid to cylinders in the testing station, mechanical brake unit operating means at said testing station, pressure responsive means associated with testing station to respond to the hydrostatic pressure of liquid pressurized in brake cylinders in the testing station, another of said holders defining a switch assembly station, fluid pressure switch supplying means at said switch assembly station, power operated switch assembly means at said switch assembly station for assembling switches from said switch supplying means into brake cylinders in said switch assembly station, another of said holders defining a switch testing station, a rotary contact support at said switch testing station, contact means on said contact support, power means for rotating said contact support, power means for advancing said contact support into testing position, power operated pressure applying means in said switch testing station, power operated cylinder clamping means operatively mounted at each of said assembly stations and at each of said testing stations, one of said holders defining reject stations located proximate to said testing stations, and cylinder reject means operatively associated with each of said reject stations.

14. In apparatus for assembling and testing brake cylinder units, the combination of means defining a sequence of stations, means for transferring brake cylinders to successive ones of said stations, threaded connector feeding means located at one of said stations, power operated torque means and power operated advancing means therefor located at said one station for threading connector elements from said feeding means into brake cylinders in said one station, another one of said stations constituting a hydrostatic testing station, liquid dispensing means associated with said hydrostatic testing station for supplying liquid to brake cylinders in said hydrostatic testing station, means for pressurizing liquid in brake cylinders in said testing station, fluid pressure sensing means associated with said testing station to respond to the hydrostatic pressure of fluid pressurized in brake cylinders in said testing station, one of said stations constituting a pressure switch assembly station, pressure switch feeding means at said switch assembly station, power operated assembly means and power advancing means therefor located at said switch assembly station to assemble switches from said switch feeding means into brake cylinders in the switch assembly station, one of said stations constituting a switch testing station, fluid pressure developing means at said switch testing station, a rotary contact support, contact means on said support, power means for rotating said contact support, power means for advancing said contact support into operative position, at least one of said stations constituting a reject station, brake cylinder reject lifting means mounted at said reject station to shift defective structures upwardly, and transfer means mounted at said reject station to move away therefrom defective structures lifted from the reject station by the coacting reject lifting means.

15. In master brake cylinder assembly and testing apparatus, the combination of means defining a series of brake cylinder stations, transfer means for moving brake cylinders into said stations in succession, one of said stations constituting a cylinder and switch assembling station, pressure switch feeding means located at said assembly station, power operated switch assembly means and power operated advancing means therefor located at said assembly station to assemble into brake cylinders pressure switches supplied from said switch feeding means, another of said stations constituting a pressure switch testing station, a rotary contact holder mounted adjacent said testing station, power means for advancing and retracting said contact holder, power means connected to rotate said contact holder, and test contacts supported on said holder in spaced relation to each other for engagement with a switch assembled with a brake cylinder in said testing station.

16. Brake cylinder assembly and testing apparatus, comprising, in combination, means defining a series of brake cylinder stations, power transfer means for transferring brake cylinders to said stations in succession, one of said stations constituting a connector assembly station, connector feeding means located at said assembly station, connector assembly means including power actuating means and power advancing means for assembling connectors from said feeding means into brake cylinders in said assembly station, another of said stations constituting a hydrostatic testing station, liquid metering means for said testing station, said metering means including a liquid measuring cylinder and a piston for displacing liquid from said cylinder, power operating means for said piston, liquid injecting means located at said testing station and including a liquid injecting nozzle connected with said metering cylinder, power operating means connected with said nozzle to advance the latter into engagement with an assembled connector in said testing station, pressure sensing means interconnected with said nozzle to sense the hydrostatic pressure of liquid injected into a connector in said testing station, one of said stations constituting a reject station, power lifting means at each reject station for shifting a cylinder upwardly therefrom, track means adjacent said reject station, reject transfer means carried by said track means, and means for operating said reject transfer means to remove a cylinder from said lifting means.

17. In apparatus for assembling and testing master brake cylinder units, the combination of means defining a series of master brake cylinder stations, power transfer means for transferring brake cylinders to successive ones of said stations, threaded connector feeding means located at one of said stations, connector assembly means including power operated torque means and power operated advancing means therefor located at said one assembly station for assembling connectors from said feeding means into brake cylinders in said one assembly station, another of said stations constituting a hydrostatic testing station including liquid metering means, power operated injecting means coacting with said metering means for injecting liquid into brake cylinders in said hydrostatic testing station, fluid pressure sensing means connected to respond to the hydrostatic pressure of fluid injected into a brake cylinder in said testing station by said injecting means, another of said stations constituting a pressure switch assembly station, pressure switch feeding means at said switch assembly station, power operated switch assembly means and power advancing means therefor located at said switch assembly station to assemble switches from said switch feeding means into brake cylinders in said switch assembly station, one of said stations succeeding said switch assembly station constituting a switch testing station, power actuated fluid pressure developing means at said switch testing station, test sensing contact means, power actuating means coacting with said contact means to move the latter into engagement with switches assembled in brake cylinders in said switch testing station, another of said stations constituting a plug assembly station, plug feeding means located at said plug assembly station, plug assembly means including power operating and advancing means therefor located at said plug assembly station for assembling plugs from said plug feeding means into cylinders in said plug assembly station, another of said stations including a reject station, and transfer means operatively associated with said reject station to transfer brake cylinder structure away therefrom.

18. In apparatus for assembling a master cylinder brake unit, the combination of means defining a series of brake cylinder stations, transfer means for moving brake cylinders into successive ones of said stations, one of said stations constituting a connector assembly station, connector feeding means at said assembly station, power operated connector assembling means for assembling connectors from said feeding means into brake cylinders in said assembly station, another of said stations constituting a switch assembly station, pressure switch feeding means at said switch assembly station, power operated switch assembling means at said switch assembly station for assembling switches from said switch feeding means into brake cylinders in said switch assembly station, another of said stations constituting a cover assembly station, another of said stations constituting a torquing station, power operated torque applying means at said torquing station, another of said stations constituting a plug assembly station, plug feeding means at said plug assembly station, power operated plug assembly means at said plug assembly station for assembling plugs from said plug feeding means into brake cylinders in said plug assembly station, another of said stations constituting a cleaning station, cylinder unit cleaning means at said cleaning station, another of said stations constituting a switch testing station, power operating means at said switch testing station for pressurizing liquid in a brake cylinder therein, test sensing contact means at said testing station, power advancing means coacting with said contact means to move the latter into coacting relation with assembled switches in said testing station, another of said stations constituting a reject station, and reject transfer means associated with said reject station to transfer brake cylinders therefrom.

19. In apparatus for assembling a master cylinder brake unit, the combination of means defining a series of brake cylinder stations, transfer means for moving brake cylinder into successive ones of said stations, one of said stations constituting a switch assembly station, pressure switch feeding means at said assembly station, power operated switch assembly means at said switch assembly station for assembling switches from said switch feeding means into brake cylinders in said switch assembly station, another of said stations constituting a cover assembly station, another of said stations constituting a torquing station, power operated torque applying means for said torquing station, another of said stations constituting a plug assembly station, plug feeding means at said plug assembly station, power operated plug assembly means at said plug assembly station for assembling plugs from said plug feeding means to brake cylinders in said plug assembly station, another of said stations constituting a switch testing station, power operating means at said switch testing station for pressurizing liquid in a brake cylinder therein, and test sensing contact means in said testing station, power advancing means coacting with said contact means to move the latter into coacting relation with assembled switches in said testing station.

20. The method of assembling and testing master brake cylinder units which are individually formed of components including a housing, fluid actuator means, valve means, a cover, and a pressure responsive switch; said method comprising the steps of supplying a succession of brake cylinder housings to the first of a series of stations which include a plurality of assembly stations and a plurality of testing stations, intermittently advancing housings to successive stations of said series by power transfer means which effects simultaneous advancement by one station of housings in all said stations, automatically applying holding means in coacting holding relation to each successive housing advanced into each of said assembly and testing stations; automatically assembling, in timed relation to said simultaneous advancement of housings, brake cylinder unit components with housings in all of said assembly stations simultaneously to effect a plurality of assembly operations including the assembly of a pressure responsive switch with a housing in one of said stations and the assembly of a cover with a housing in another of said stations; automatically filling assembled brake cylinder unit structure in one of said testing stations with fluid concurrently with the assembly of cylinder unit components in said assembly stations, automatically performing, concurrently with the assembly of components in said assembly stations, testing operations on assembled cylinder unit structures in the testing stations in which housings are located to effect a pressure test in one of said testing stations and a switch test in another of said testing stations; rejecting, in timed relation to said simultaneous housing advancement, housings bearing faulty assemblies as determined by said testing operations; and removing an assembled and tested brake cylinder unit from the last station in said series in timed relation to said simultaneous advancement of the housings.

21. The method of assembling and testing master brake cylinder units which are individually formed of components including a housing, fluid actuator means, valve means, a connector, and a pressure responsive switch; said method comprising the steps of simultaneously supporting a plurality of brake cylinder housings in a corresponding series of stations which include a plurality of assembly stations and a plurality of testing stations; automatically assembling brake cylinder unit components with housings in all of said assembly stations simultaneously to effect brake unit assembly operations including the assembly of a connector with a housing in one of said stations, the assembly of a pressure responsive switch with a housing in another of said stations, the tightening of a cover screw in another station, and the application of a plug in another station; automatically performing, concurrently with the assembly of components in said assembly stations, testing operations on the assembled cylinder unit structures in all of the test stations in which housings are located; periodically advancing all of the housings in all of said stations simultaneously by power transfer means which effects advancement of each advanced housing by one station, operating positive holding means in all of said assembly and testing stations simultaneously in timed relation to the advancement of the housings to positively hold firmly in each of said assembly and testing stations each successive housing advanced thereinto, rejecting in timed relation to said simultaneous housing advancement housings bearing faulty assemblies as determined by said testing operations in said testing stations, supplying a succession of housings to the first station in said series in timed relation to said simultaneous advancement of the housings, and removing an assembled and tested brake cylinder unit from the last station in said series in timed relation to said simultaneous advancement of the housings.

22. The method of assembling and testing master brake cylinder units which are individually formed of components including a housing, fluid actuator means, valve means, a connector, and a pressure responsive switch; said method comprising the steps of supplying a succession of brake cylinder housings to the first of a series of stations which include a plurality of assembly stations, a plurality of testing stations, and a plurality of reject stations; intermittently advancing housings to successive stations of said series by power transfer means which effects simultaneous advancement by one station of housings in all said stations, automatically clamping firmly but temporarily in each of said assembly and testing stations successive housings advanced thereinto by the power transfer means; automatically assembling, in timed relation to said simultaneous advancement of housings, brake cylinder unit components with housings in all of said assembly stations simultaneously to effect assembly of a connector with a housing in one of said stations, the assembly of a pressure responsive switch with a housing in another of said stations, the tightening of threaded means in another of said stations, and the assembly of a plug in another of said stations; automatically performing, concurrently with the assembly of components in said assembly stations, testing operations on assembled cylinder unit structures in the testing stations in which housings are located to effect a pressure test in one of said testing stations, a switch test in another of said testing stations, and a porosity test in another of said stations; rejecting in said reject stations, in timed relation to said simultaneous housing advancement, housings bearing faulty assemblies as determined by said testing operations performed in said testing stations, and removing an assembled and tested brake cylinder unit from the last station in said series in timed relation to said simultaneous advancement of the housings.

23. The method of assembling and testing master brake cylinder units which are individually formed of components including a housing, fluid actuator means, valve means, and a pressure responsive switch, said method comprising the steps of simultaneously supporting a plurality of brake cylinder housings in a corresponding series of stations which include a plurality of assembly stations and a plurality of testing stations, automatically assembling brake cylinder unit components with housings in all of said assembly stations simultaneously, automatically filling assembled brake cylinder unit structure in one of said testing stations with fluid concurrently with the assembly of cylinder unit components in said assembly stations; automatically performing, concurrently with the assembly of components in said assembly stations, testing operations on the assembled cylinder unit structures in the test stations in which housings are located; periodically advancing all of the housings in all of said stations simultaneously by power transfer means which effects advancement of each advanced housing by one station, positively holding firmly but temporarily in each of said assembly and testing stations each successive housing advanced thereinto, rejecting, in timed relation to said periodic advancement of the housings, housings bearing faulty assemblies as determined by said testing operations in said testing stations, supplying a succession of housings to the first station in said series in timed relation to said simultaneous advancement of the housings, and removing an assembled and tested brake cylinder unit from the last station in said series in timed relation to said simultaneous advancement of the housings.

References Cited in the file of this patent

UNITED STATES PATENTS

| | | |
|---|---|---|
| 2,136,302 | Leighton | Nov. 8, 1938 |
| 2,322,009 | Fowler | June 15, 1943 |
| 2,459,535 | Kapischiansky | Jan. 18, 1949 |
| 2,490,821 | Leonard | Dec. 13, 1949 |
| 2,534,123 | Hasselhorn | Dec. 12, 1950 |
| 2,615,327 | Foust et al. | Oct. 28, 1952 |
| 2,761,559 | Burge et al. | Sept. 4, 1956 |

OTHER REFERENCES

"Valves," published by Anglo-American Council on Productivity, June 1951.